(12) United States Patent
Zarabadi

(10) Patent No.: US 6,918,282 B2
(45) Date of Patent: Jul. 19, 2005

(54) SELF-TEST CIRCUIT AND METHOD FOR TESTING A MICROSENSOR

(75) Inventor: Seyed R. Zarabadi, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 92 days.

(21) Appl. No.: 10/401,207

(22) Filed: Mar. 27, 2003

(65) Prior Publication Data

US 2004/0187555 A1 Sep. 30, 2004

(51) Int. Cl.[7] .............................................. G01P 21/00
(52) U.S. Cl. ........................ 73/1.38; 73/1.88; 324/601; 29/592; 702/116
(58) Field of Search ................................. 73/1.37–1.38, 73/1.01, 1.88; 702/88, 116; 324/601; 29/592, 595

(56) References Cited

U.S. PATENT DOCUMENTS

| | | | | |
|---|---|---|---|---|
| 5,506,454 A | | 4/1996 | Hanzawa et al. ............ | 307/10.1 |
| 5,511,007 A | * | 4/1996 | Nihei et al. ................ | 702/116 X |
| 5,517,431 A | * | 5/1996 | Pattantyus et al. .......... | 702/116 |
| 5,583,290 A | | 12/1996 | Lewis ........................ | 73/514.18 |
| 6,257,061 B1 | | 7/2001 | Nonoyama et al. ........ | 73/514.32 |
| 6,257,062 B1 | | 7/2001 | Rich .......................... | 73/514.32 |
| 6,393,914 B1 | | 5/2002 | Zarabadi et al. ............ | 73/514.04 |
| 6,428,713 B1 | | 8/2002 | Christenson et al. ........ | 216/2 |
| 6,450,029 B1 | * | 9/2002 | Sakai et al. ................. | 73/1.38 X |
| 6,666,092 B2 | * | 12/2003 | Zarabadi et al. ............ | 73/514.02 |
| 6,718,826 B2 | * | 4/2004 | Zarabadi et al. ............ | 73/514.38 |
| 6,761,070 B2 | * | 7/2004 | Zarabadi et al. ............ | 73/514.32 |
| 2002/0011107 A1 | | 1/2002 | Sakai et al. ................. | 73/514.32 |
| 2002/0148291 A1 | | 10/2002 | Nagahara et al. .......... | 73/514.32 |
| 2003/0033847 A1 | * | 2/2003 | Freehill et al. ............ | 73/1.01 |
| 2004/0134256 A1 | * | 7/2004 | Herrmann et al. ......... | 73/1.37 X |

FOREIGN PATENT DOCUMENTS

DE   100 46 958   3/2001   ......... G01P/15/125

OTHER PUBLICATIONS

Atherton, J H: "Sensor Signal Conditioning—An IC Designer's Perspective" Electro International. Conference Record, New York, NY, USA, Apr. 16–18, 1991, Apr. 16, 1991, pp. 129–134, XP010305348 *p. 133*.

Henry V. Allen et al., Accelerometer Systems With Built-in Testing, 1990, Sensors and Actuators, 381–386, month not given.

* cited by examiner

*Primary Examiner*—Thomas P. Noland
(74) *Attorney, Agent, or Firm*—Stefan V. Chmielewski

(57) ABSTRACT

A test circuit and method provide testing of a capacitive type microsensor. The method includes applying a first signal having a first voltage potential to an input of a microsensor during a non-test operating mode. The method also includes applying a second voltage signal having a second voltage potential different than the first voltage potential during a test mode. The second voltage potential induces a net differential electrostatic force in the microsensor. The method further includes the steps of monitoring an output signal of the microsensor, comparing the output signal to an expected value when the microsensor is in the test mode, and determining if the microsensor is functioning properly as a function of the comparison.

16 Claims, 9 Drawing Sheets

SELF-TEST CIRCUIT AND METHOD FOR TESTING A MICROSENSOR

TECHNICAL FIELD

The present invention generally relates to microsensors and, more particularly, relates to the testing of microfabricated capacitive type microsensors.

BACKGROUND OF THE INVENTION

Microsensors are miniaturized sensing devices that are increasingly being employed for sensing dynamic motion such as acceleration and rate of change of position. Accelerometer microsensors measure the second derivative of displacement with respect to time and include linear and angular accelerometer microsensors. Linear and angular accelerometers are frequently employed to generate an output signal (e.g., voltage) proportional to the sensed acceleration for use in vehicle controls systems. For example, the sensed output from a linear accelerometer microsensor may be used to control safety-related devices on an automotive vehicle, such as front and side impact air bags, or may be employed for vehicle dynamics control and suspension control applications. The sensed output from an angular accelerometer microsensor may be employed to determine a potential vehicle rollover event, to control various automotive control devices, and to control disc drive read/write head assemblies.

Many microsensors are capacitive type sensing devices that employ a capacitive coupling between a fixed plate and a movable plate that is movable in response to the sensed motion. One example of a linear accelerometer microsensor is disclosed in application Ser. No. 10/059,010, filed Jan. 31, 2002, and now U.S. Pat. No. 6,761,070, issued on 13 Jul. 2004, entitled "MICROFABRICATED LINEAR ACCELEROMETER", assigned to the assignee of the present invention, which is hereby incorporated herein by reference. An example of an angular accelerometer microsensor is disclosed in U.S. Pat. No. 6,393,914, issued on 28 May 2002, entitled "ANGULAR ACCELEROMETER", assigned to the assignee of the present invention, which is hereby incorporated herein by reference. Other examples of angular accelerometer microsensors disclosed in commonly assigned U.S. application Ser. No. 10/055,536, filed Feb. 28, 2002, and now U.S. Pat. No. 6,718,826 issued on 13 Apr. 2004, entitled "BALANCED ANGULAR ACCELEROMETER", and application Ser. No. 10/085,793, filed Feb. 28, 2002, and now U.S. Pat. No. 6,666,092, issued on 23 Dec. 2003, entitled "ANGULAR ACCELEROMETER HAVING BALANCED INERTIA MASS", both of which are also assigned to the assignee of the present invention, and are hereby incorporated herein by reference.

The aforementioned microsensors are generally fabricated by employing micro-electro-mechanical (MEM) fabrication techniques, such as etching and micromachining processes. Following manufacture of the microsensor, the microsensor is typically tested to determine if the microsensor functions properly and to determine the need for any scale factor calibration. In the past, microsensors were typically tested by employing expensive hardware including a mechanical shaker designed to physically shake the microsensor under test to apply a predetermined motion (e.g., acceleration) to the microsensor. In response to applying the predetermined motion, the microsensor output is monitored and compared to an expected value. The deviation between the expected and measured values is processed to determine any error. The error may be used to determine if the microsensor is faulty and/or to trim integrated circuitry to adjust the scale factor calibration of the microsensor, prior to using the microsensor. While the mechanical shaker testing approach offers the ability to test the microsensor immediately following manufacture, the test procedure generally cannot be easily implemented once the microsensor is employed in an application. Additionally, the mechanical hardware of the shaker is generally expensive.

It is therefore desirable to provide for a low cost, easy to implement test circuit for testing the functioning of a microsensor. It is further desirable to provide for a reliable self-test circuit for testing the microsensor that allows for testing while the microsensor is implemented in its intended application.

SUMMARY OF THE INVENTION

In accordance with the teachings of the present invention, a test circuit and method are provided for testing a capacitive type microsensor. According to one aspect of the present invention, the method includes the steps of applying a first signal having a first voltage potential to an input of a microsensor during a non-test operating mode. The method also includes applying a second voltage signal having a second voltage potential different than the first voltage potential during a test mode. The second voltage potential induces a change in electrostatic force in the microsensor as compared to the first voltage potential. The method further includes the steps of measuring an output signal of the microsensor, comparing the output signal to an expected value when the microsensor is in the test mode, and determining if the microsensor is functioning properly as a function of the comparison.

According to another aspect of the present invention, the test circuit includes a voltage selection circuitry for selecting one of a first voltage signal and a second voltage signal. The second voltage signal has a voltage potential offset from the first voltage signal. The test circuit has output circuitry for applying the first voltage signal to an input of a microsensor during a non-test mode of operation, and applying the second voltage signal to the input of the microsensor during a test mode. The test circuit also includes an input for receiving an output signal generated by the microsensor. A comparator compares the output signal of the microsensor to an expected value during the test mode. The test circuit further has a controller for determining whether the microsensor functions properly based on the comparison.

The test circuit and method of the present invention induces an electrostatic force on the microsensor during the test mode and monitors the output signal to determine whether the microsensor is functioning properly. The test circuit and method may be employed following manufacture of a microsensor, and may be further employed following implementation of the microsensor in an intended application. Thus, the microsensor may be routinely tested to check if it is functioning properly.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

The present invention is directed to an electronic self-test circuit and method for testing the operation of a mechanical capacitive type microsensor. The self-test circuit and method of the present invention are described herein for use with one example of a linear accelerometer microsensor 10, generally shown in FIGS. 1–4 and also disclosed in U.S. Pat. No. 6,761,070, issued 13 Jul. 2004. It should be appreciated that the test circuit and method of the present invention may be used to test any of a variety of microsensors having a capacitive-type sensing arrangement and, thus, is not limited to the linear accelerometer disclosed herein. The test circuit and method is applicable to any of a number of microsensors including, but not limited to linear accelerometers, angular accelerometers, linear rate sensors, and angular rate sensors. Examples of angular accelerometer microsensors are described in U.S. Pat. No. 6,393,914, issued 28 May 2002, U.S. Pat. No. 6,718,826, issued 13 Apr. 2004 and U.S. Pat. No. 6,666,092, issued 23 Dec. 2003.

Figure 1:
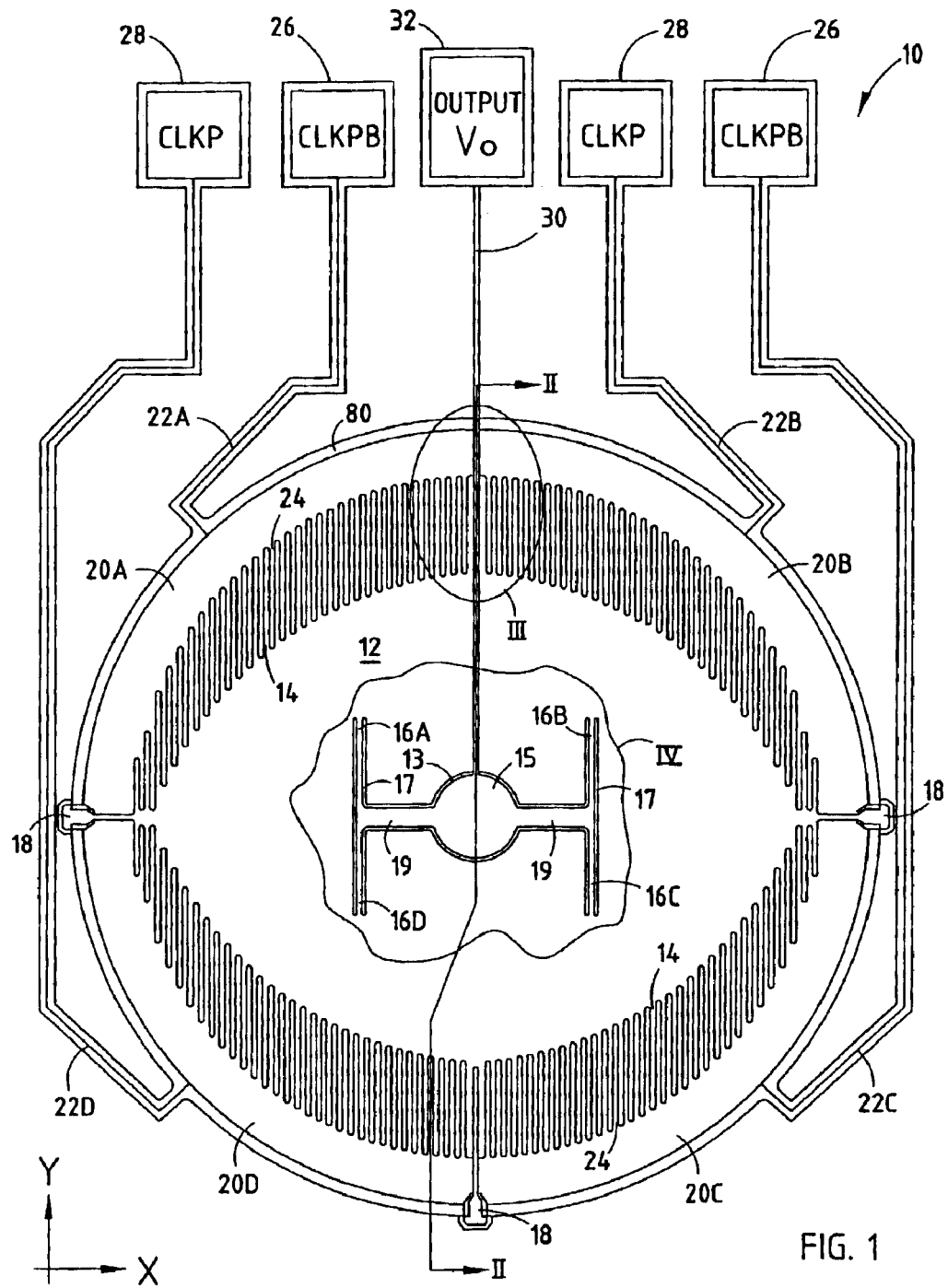
FIG. 1 is a top view of a linear accelerometer microsensor formed on a substrate.
Figure 2:
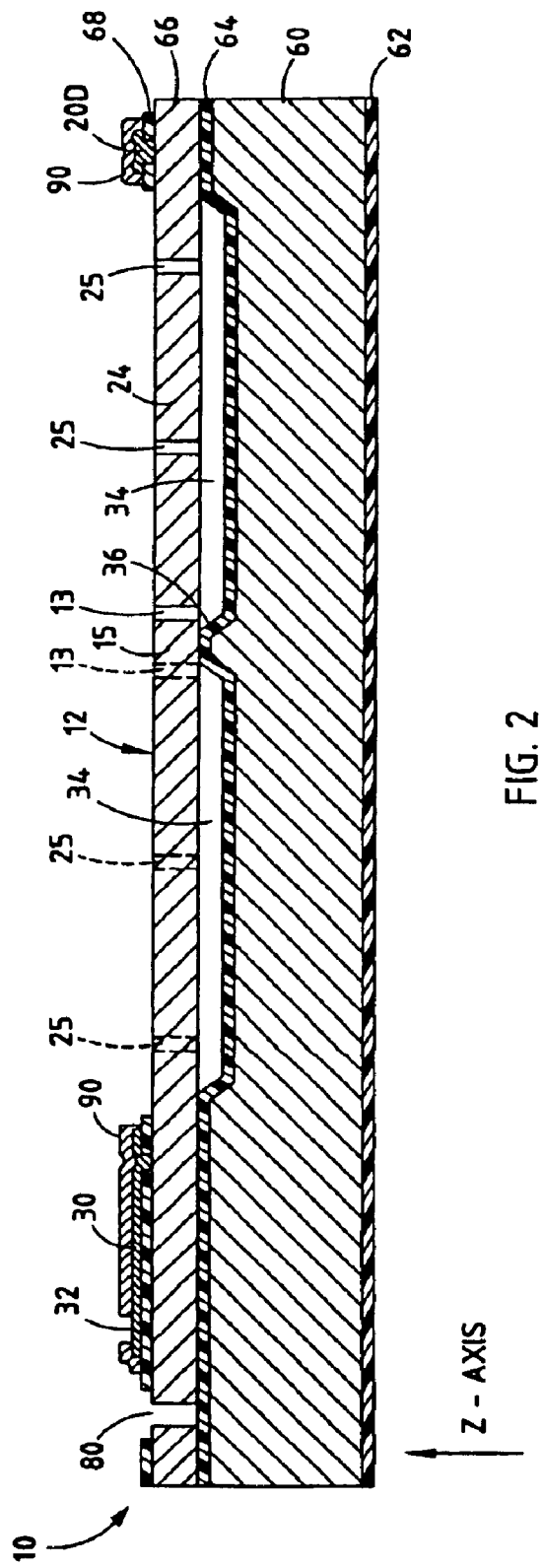
FIG. 2 is a cross-sectional view of the linear accelerometer microsensor taken through lines II—II of FIG. 1.

Referring to FIGS. 1 and 2, a linear accelerometer microsensor 10 is illustrated for sensing linear acceleration along a designated sensing axis, shown configured as the X-axis. The linear accelerometer microsensor 10 senses linear acceleration along the sensing X-axis, while preventing the sensing of linear off-axis accelerations along other axes, such as the Y-axis and Z-axis, and rotational cross-axis accelerations. The linear accelerometer microsensor 10 is a micromachined accelerometer having an inertial mass and supporting structure.

The microsensor 10 is fabricated on a single-crystal silicon substrate 60 using a trench etching process, such as DRIE and bond-etchback process. The etching process may include etching out a pattern from a doped material suspended over a cavity 34 to form a conductive pattern that is partially suspended over the cavity 34. One example of an etching process that may be used to form the microsensor 10 is disclosed in commonly assigned U.S. Pat. No. 6,428,713, issued on Aug. 6, 2002, and entitled "MEMS SENSOR STRUCTURE AND MICROFABRICATION PROCESS THEREFOR," which is hereby incorporated herein by reference. While the microsensor 10, as described herein, is fabricated on a single-crystal silicon substrate using a trench etching process, it should be appreciated that the microsensor 10 could be fabricated using other known fabrication techniques, such as: an etch and undercut process; a deposition, pattern, and etch process; and an etch and release process.

The linear accelerometer microsensor 10 includes an inertial mass 12, generally formed in the shape of an annular ring, suspended over cavity 34, and a stationary central member 15 trench etched from the mass 12 and fixedly attached to the underlying substrate 60 via oxide layer 64 and centered in the annular ring-shaped mass 12. The inertial mass 12 has a plurality of rigid comb-like conductive fingers 14 extending outward from the outer peripheral edge of the annular ring to serve as movable capacitive plates. The conductive fingers 14 are formed along an axis (e.g., Y-axis) perpendicular to the sensing axis (e.g., X-axis). The inertial mass 12 with comb-like conductive fingers 14, is a movable mass that is suspended over a cavity by support arms which are formed to allow inertial mass 12 to move linearly about the sensing X-axis when subjected to a linear acceleration along the sensing X-axis of the linear accelerometer 10. For purposes of discussion herein, the X-axis and Y-axis are defined as shown oriented in FIG. 1, and the Z-axis is defined as shown in FIG. 2.

The linear accelerometer microsensor 10 has a main central portion having a substantially elliptical shaped ring, with the conductive fingers 14 extending outward from the central portion and perpendicular to the sensing X-axis. Accordingly, the plurality of conductive finger 14 are arranged extending along the Y-axis. The length of the conductive fingers 14 may vary as shown such that longer conductive fingers 14 are formed at the narrower part of the central portion of mass 12, as compared to the wider part of the central portion of mass 12, to achieve a substantially round-shape for the overall configuration of the inertial mass 12 and conductive fingers 14.

The inertial mass 12 is shown generally suspended above cavity 34 via a support assembly including four support arms (i.e., tethers) 16A–16D. The four support arms 16A–16D are spaced apart from one another so as to support four corresponding quadrants of the inertial mass 12. While four support arms 16A–16D are shown and described herein, any number of a plurality of support arms may be employed.

A central member 15 is fixed to the underlying substrate and is located substantially in the center region of the inertial mass 12. The central member 15 is connected to rigid members 19 extending on opposite sides along the X-axis, with each of the support arms 16A–16D extending along the Y-axis from the outer end of one of the rigid members 19. Thus, support arms 16A–16D are formed as extensions from the rigid members 19 which, in turn, are formed as extensions from the central member 15. The central member 15 and rigid members 19 are substantially fixed with respect to the substrate and are generally inflexible to acceleration. The support arms 16A–16D are flexible beams that act as springs which are compliant to bending along the sensing X-axis, but are relatively stiff to bending in the direction of the Z-axis which extends perpendicular to a plane formed by the X-axis and Y-axis. Additionally, the extension of the support arms 16A–16D along the Y-axis further prevents movement along the Y-axis. The support arms 16A–16D may have a thickness (depth) in the range of three to two hundred micrometers and a width in the range of one to twenty micrometers. According to one example, support arms 16A–16D may have a thickness of approximately thirty micrometers as compared to a width of approximately ten micrometers to provide a sufficient aspect ratio of thickness-to-width to allow for flexibility along the X-axis and stiffness in the Z-axis.

A pair of parallel slots (trenches) 17 are etched in the inertial mass 12 to form each of the support arms 16A–16D. The slots 17 extend through the entire depth of the inertial mass 12 and, in effect, results in slots 17 formed on opposite sides of each support arm. The slots 17 form air gaps which allow the support arms 16A–16D to be connected at a location radially outward from the inner edge, thereby providing for an increased effective overall length and greater flexibility of the support arms 16A–16D. The four support arms 16A–16D thereby substantially suspend the inertial mass 12 above cavity 34, and allow linear movement of the inertial mass along the X-axis when subjected to linear acceleration along the X-axis. By employing four support arms 16A–16D, the entire structure is stiff with respect to linear accelerations along the Y-axis, yet the inertial mass 12 is free to move along the X-axis within the constraints of the support arms 16A–16D.

Fixed to a thick oxide insulation layer 64 on top of substrate 60 are four fixed electrodes 20A–20D, each having a plurality of fixed capacitive plates 24 interdisposed between adjacent movable capacitive plates 14, to form four banks of variable capacitors. The first fixed electrode 20A has a clocked input line 22A for receiving a clocked signal CLKPB 26, such as a square wave signal. The plurality of fixed capacitive plates 24 provided with the first fixed electrode 20A are interdisposed between adjacent movable capacitive plates 14 of inertial mass 12 for approximately one-quarter rotation (i.e., a ninety degree window) of inertial mass 12, to provide a first bank of capacitors. The second fixed electrode 20B likewise has a plurality of fixed comb-like capacitive plates 24 interdisposed between adjacent movable capacitive plates 14 of inertial mass 12 for approximately one-quarter of its rotation to provide a second bank of capacitors. The second fixed electrode 20B has a clocked input 22B for receiving a clocked signal CLKP 28, such as a square wave signal. The third fixed electrode 20C also includes a plurality of fixed comb-like capacitive plates 24 for approximately one-quarter of movable capacitive plates 14 of inertial mass 12, to provide a third bank of capacitors, and likewise receives clocked signal CLKPB 26 via input line 22C. The fourth fixed electrode 20D has a plurality of fixed capacitive plates 24 for approximately the remaining one-quarter of the movable capacitive plates 14 of inertial mass 12, to provide a fourth bank of capacitors, and receives clocked signal CLKP 28 via input line 22D. It should be appreciated that the number of fixed electrodes can be increased to multiplies of four, as represented by equation 4×N, where N=1, 2, 3, 4, etc., which may advantageously provide for good matching and cross-axis rejections.

Each of the fixed electrodes 20A–20D are formed near the outer perimeter of the inertial mass 12 extending through an angular rotation of approximately ninety degrees (90°). Adjacent fixed electrodes 20A–20D are dielectrically isolated from one another via isolators 18. Each isolator 18 has one or more slots that serve to provide a dielectric air gap. The fixed electrodes 20A–20D and corresponding plurality of fixed capacitive plates 24 are fixed in place supported on top of insulation layer 64 and substrate 60. Accordingly, the inertial mass 12 and its rigid outer peripheral capacitive plates 14 are able to move relative to fixed capacitive plates 24 in response to a linear acceleration experienced along the sensing X-axis.

The inertial mass 12 and movable capacitive plates 14 are electrically conductive and are electrically connected via an output line 30 to output pad 32 for providing an output charge $V_O$. The output charge $V_O$ is processed to generate a voltage which has a voltage level indicative of the linear displacement of the inertial mass 12 relative to the fixed electrodes 20A–20D due to linear acceleration about the sensing X-axis. Accordingly, by measuring the output charge $V_O$ at output pad 32, the linear accelerometer microsensor 10 provides an indication of the linear acceleration experienced along the sensing X-axis.

With particular reference to the cross section shown in FIG. 2, the linear accelerometer microsensor 10 includes substrate 60 which serves as the underlying support. Substrate 60 may include a silicon or silicon-based substrate having the thick oxide insulation layer 64 formed on the top surface, and a bottom oxide insulation layer 62 formed on the bottom surface. The substrate 60 may include silicon, or alternate materials such as glass or stainless steel. The substrate 60 and thick oxide insulation layer 64 are configured to provide a cavity 34 below the inertial mass 12. Additionally, substrate 60 and oxide layer 64 form a central pedestal 36 below the fixed central member 15 for purposes of fixing the central member 15 in place relative to the substrate 60. Central pedestal 36 also provides structural support during the fabrication process.

Formed above the substrate 60 and on top of insulation layer 64 is an EPI layer 66 made of conductive material, such as silicon. EPI layer 66 is made of a conductive material and is etched to form various components including the inertial mass 12, central member 15, isolation trenches 80, air gaps 13 and 25, and other elements that support or isolate conductive signal paths. Trenches 80 and air gaps 13 and 25 provide physical and electrical isolation between adjacent elements. The EPI layer 66 may have a thickness in the range of 3 to 200 micrometers, and more particularly of approximately 30 micrometers. With the main exception of the inertial mass 12, central member 15, and fingers of movable and stationary plates, the EPI layer 66 further includes a field passivation layer 68 disposed on the top surface thereof. The conductive signal paths of electrodes 20A–20D, lines 22A–22D, and data line 30 are formed on top of the conductive EPI layer 66 and partially on top of dielectric field passivation layer 68 to provide signal transmission paths. In addition, a metal passivation layer 90 is formed over each of these signal paths.

Prior to the etching process, the central pedestal 36 provides structural support for the EPI layer 66 to allow the central mass 15 to be fixedly provided on top thereof. By providing a central pedestal 36, the structural integrity of the linear accelerometer microsensor 10 is enhanced during the fabrication process. After the etching process, the central pedestal 36 supports the central member 15 which, in turn, supports the inertial mass 12 via rigid members 19 and support arms 16A–16D. By supporting the EPI layer 66 in the central region during the manufacturing process, the maximum stress experienced is greatly reduced.

Figure 3:
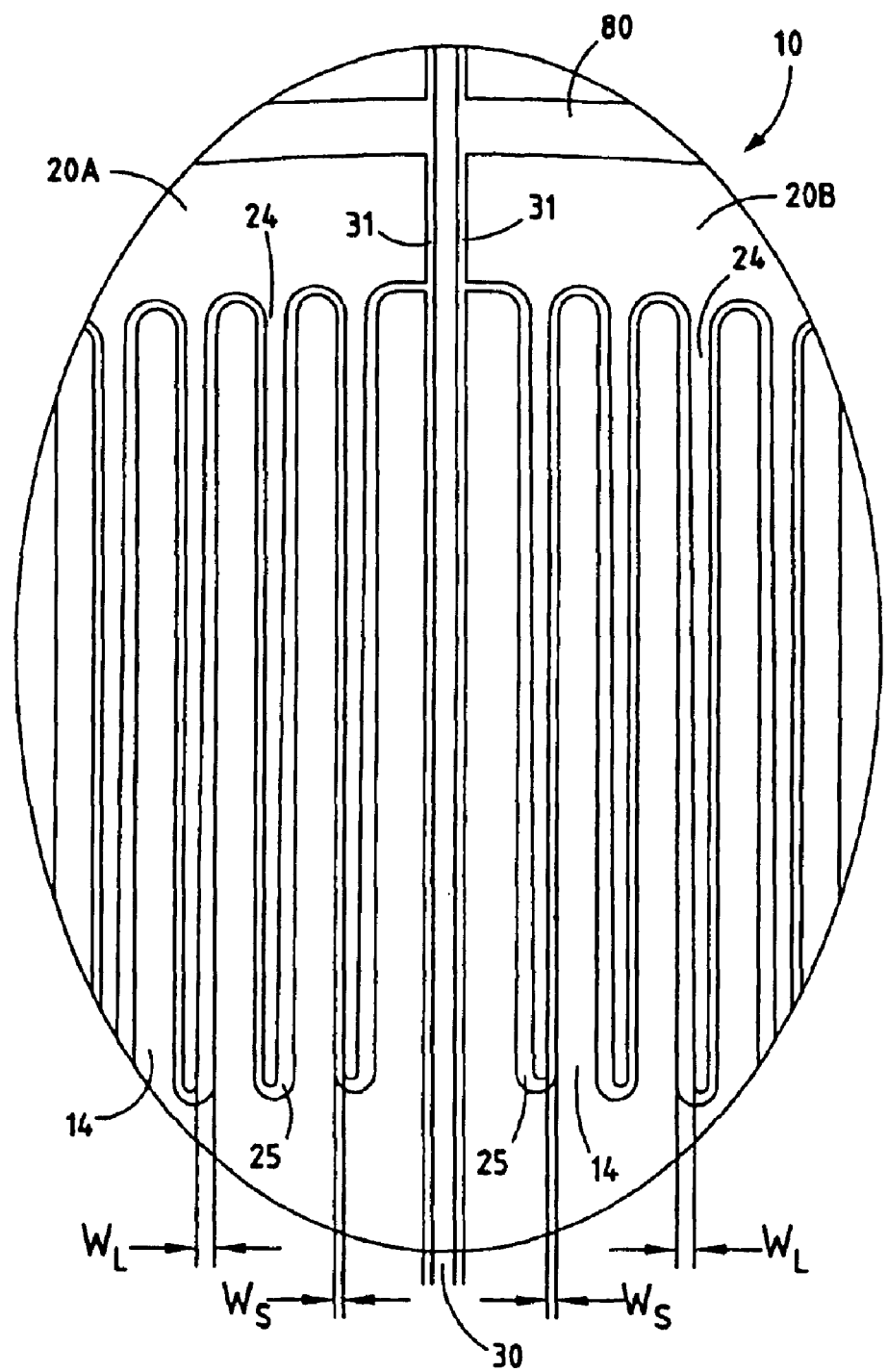
FIG. 3 is an enlarged view of section III of FIG. 1.

Referring to FIG. 3, a portion of the linear accelerometer microsensor 10 is further illustrated in greater detail. Data line 30 extends within a pair of parallel radial slots 31 extending along the Y-axis formed through the entire depth of inertial mass 12 to provide an electrical path between the central member 15 and the output pad 32. The slots 31 provide dielectric isolation between the data line 30 and inertial mass 12, as well as between adjacent fixed electrodes 20A and 20B, while allowing the inertial mass 12 and capacitive plates 14 to move along the X-axis, within limits. Trenches 80 isolate the fixed electrodes from the outer surrounding elements. The fixed capacitive plates 24 are interdisposed between adjacent movable capacitive plates 14 and separated one from another via air gap 25. The air gap 25 between capacitive plates 14 and 24 allows for movable capacitive plates 14 to move relative to the fixed capacitive plates 24. Each of the movable capacitive plates 14 has a very small mass as compared to the inertial mass 12, and are rigid to prevent movement relative to the inertial mass 12. Additionally, the movable and fixed capacitive plates 14 and 24, respectively, each has a thickness equal to the thickness of the EPI layer 66. Because total change of capacitance is proportional to thickness of the capacitive plates 14 and 24, the signal-to-noise ratio is enhanced with enlarged thickness.

The air gap 25 between capacitive plates 14 and 24 is greater on one side of plate 14 as compared to the opposite side. For example, with respect to the bank of capacitors formed by fixed electrode 20B, the width $W_L$ of air gap 25 between capacitive plates 14 and 24 is approximately twice the width $W_S$. The air gap 25 between adjacent pairs of capacitive plates 14 and 24 is configured substantially the same for each of the fixed capacitive plates connected to the fixed electrode. However, for adjacent fixed electrodes 20A and 20B, the orientation of the conductive plates 14 and 24 is switched in that the larger air gap with $W_L$ and smaller gap width $W_S$ of air gap 25 is on the opposite side as compared to the adjacent fixed electrode. For example, the fixed capacitive plates 24 on fixed electrode 20A are separated from movable capacitive plates 14 by an air gap 25 of width $W_L$ twice as wide on the left side of capacitive plates 14 as the width $W_S$ on the right side of capacitive plates 14, while fixed electrode 20B is configured with a larger air gap width $W_L$ on the right side of plate 14 as compared to its left side. Additionally, motion stop beads (not shown) can be formed on either or both of the movable and fixed capacitive plates 14 and 24, respectively, for limiting the relative movement between capacitive plates 14 and 24, in the event excessive linear acceleration is experienced along the X-axis.

The linear accelerometer microsensor 10 shown and described herein has four banks of variable capacitors formed by capacitive plates 14 and 24 arranged in four quadrants. The capacitive plates 14 and 24 associated with the first fixed electrode 20A in quadrant 1 are a mirror image of the capacitive plates 14 and 24 associated with the fixed electrode 20B in quadrant 2. Likewise, the arrangement of the capacitive plates 14 and 24 associated with fixed electrode 20C in quadrant 3 is a mirror image of the capacitive plates 14 and 24 associated with fixed electrode 20D in quadrant 4. The capacitive plates 24 associated with fixed electrodes 20A and 20C in quadrants 1 and 3 have a certain positive-to-negative orientation with respect to capacitive plates 14. In contrast, the positive-to-negative orientation between capacitive plates 14 and 24 for the fixed electrodes 20B and 20D in quadrants 2 and 4 are arranged oppositely with respect to the Y-axis. By alternating the orientation of the plurality of four banks of capacitors in four quadrants as disclosed, the linear accelerometer microsensor 10 essentially nulls out any residual rotational cross-axis sensitivities and linear off-axis sensitivities, and allows for linear acceleration to be sensed about the sensing X-axis. Further, by employing a plurality of fixed capacitive plates 24 commonly connected to fixed electrodes 20A–20D a reduced number of signal input and output lines may be achieved.

Figure 4:
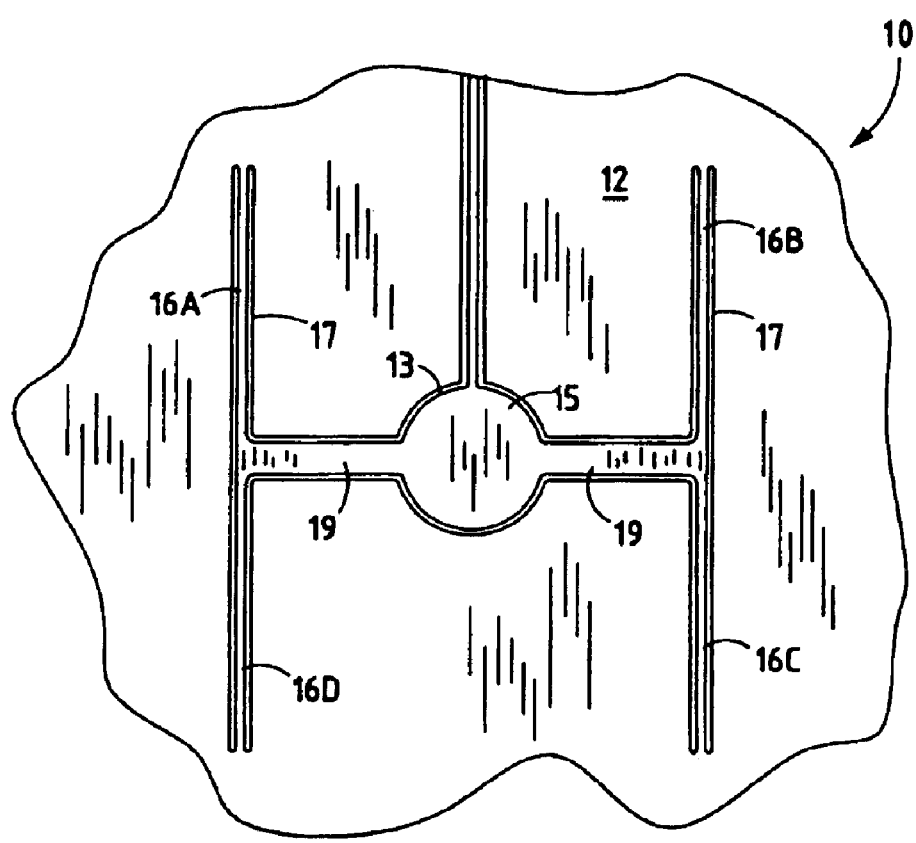
FIG. 4 is an enlarged view of central section IV of FIG. 1.

Referring to FIG. 4, an enlarged central portion of the linear accelerometer microsensor 10 is illustrated therein in greater detail. The central member 15 is shown separated from inertial mass 12 via air gap 13. Rigid members 19 extend on opposite sides and likewise are separated from the inertial mass 12 via air gap 13. At the outer ends of each of rigid members 19 are the vertically (Y-axis) disposed support arms 16A–16D, each of which extends perpendicular to the sensing X-axis. Each of support arms 16A–16D is formed by cutting out air gaps 13 from inertial mass 12. Each of support arms 16A–16D is formed of a continuous conductive signal line which, in addition to physically supporting the inertial mass 12, also transmits electrical signals. Support arms 16A–16D are formed by etching to remove material to form the bordering slots 17. Support arms 16A–16D flex within slots 17 to allow linear movement of the inertial mass 12 along the sensing X-axis relative to the central member 15 and rigid members 19. Accordingly, support arms 16A–16D provide rigid support along the Y-axis and the Z-axis, while allowing for linear motion due to acceleration about the X-axis.

Figure 5:
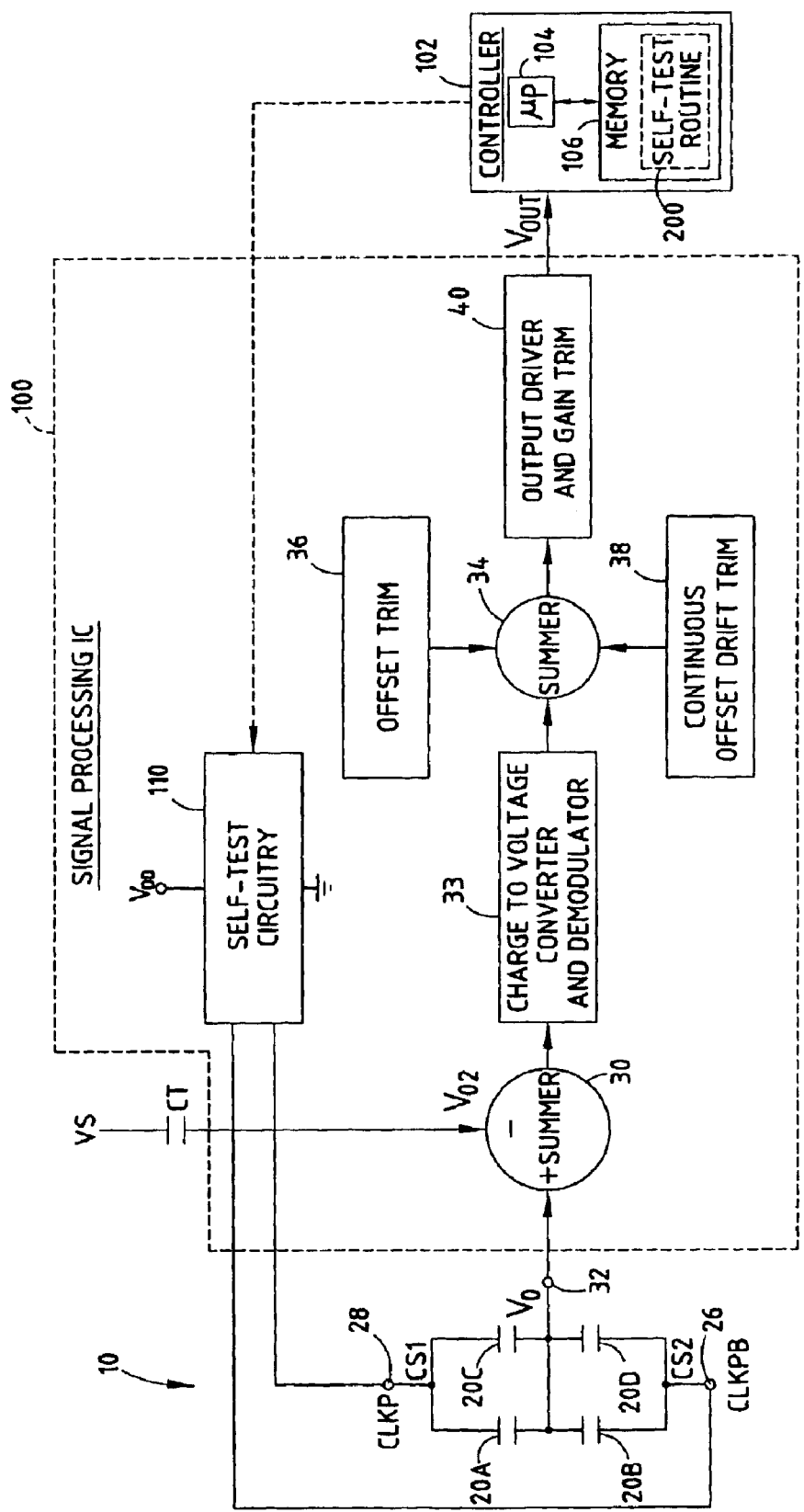
FIG. 5 is a block/circuit diagram illustrating processing circuitry including self-test circuitry coupled to the microsensor.

Referring to FIG. 5, a signal processing integrated circuit (IC) 100 is shown for providing the signals applied to the microsensor 10 and processing the signals generated by the microsensor 10. The signal processing IC 100 includes self-test circuitry 110 for performing diagnostic testing of the microsensor 10. A controller 102 is also shown for performing a self-test routine (method) according to the present invention. The fixed electrodes 20A–20D are generally shown receiving clocked signal CLKPB at input pad 26 and clocked signal CLKP at input pad 28. Clocked signals CLKPB and CLKP may be rectangular, e.g., square, wave-generated signals that have alternating high and low voltage levels of either $V_1$ and $V_3$ or $V_2$ and $V_4$ depending on whether the microsensor 10 is operating in the test mode or non-test mode. Clocked signal CLKPB is one hundred eighty degrees (180°) out of phase, i.e., inverse, as compared to clocked signal CLKP and therefore provides an opposite phase rectangular waveform. According to one example, the voltage potentials $V_1$ and $V_3$ applied to clocked signal CLKP or signal CLKPB is set at 5.0 volts and 1.0 volt, and the voltage potentials $V_2$ and $V_4$ applied to clocked signal CLKPB or signal CLKP is set at 4.5 volts and 0.5 volts.

The signal processing integrated circuitry 100 includes a summer 30, a charge-to-voltage converter and demodulator 33, a summer 34, an offset trim 36, a continuous offset drift trim 38, an output driver and gain trim 40, and the self-test circuitry 110. The summer 30 receives the output charge $V_O$ on output pad 32 and a charge $V_{O2}$ received from the summation of the capacitors, represented herein as CT, when a voltage source $V_S$ is applied thereto. Charge $V_{O2}$ contains noise present in the sensed signal, and summer 30 subtracts the noise from the output charge $V_O$. The output of summer 30 is applied to the charge-to-voltage converter and demodulator 33 which converts the processed charge to a voltage signal. The voltage signal is then input to summer 34 which receives a signal from an offset trim 36 and a signal from a continuous offset drift trim 38. The offset trim 36 provides a signal which compensates for bias errors. The continuous offset drift trim 38 provides a signal which compensates for bias drift, particularly due to temperature variations. Accordingly, summer 34 sums the trimmed signals with the voltage output so as to compensate for bias errors. The bias compensated voltage is then applied to the output driver and gain trim 40 which rescales the voltage to within a desired range and slope and produces the output signal $V_{OUT}$.

The output signal $V_{OUT}$ is processed by controller 102 which generally includes a microprocessor 104 and memory 106. The controller 102 may include a commercially available microprocessor 104 capable of processing the output signal $V_{OUT}$ and performing a self-test routine 200 as described herein. The memory 106 includes non-volatile memory storing the self-test routine 200. While a microprocessor-based controller 102 is shown and described herein, it should be appreciated that the self-test circuit and method for testing a microsensor according to the present invention may be implemented in analog or digital circuitry. In one embodiment, the self-test circuitry 110 receives a control signal from controller 102 to initiate the self-test of the microsensor 10. Alternately, the self-test method may be initiated via analog circuitry or via other input controls, such as a manual input.

The self-test circuitry 110 controls the clocked voltage signals CLKP and CLKPB applied to the microsensor input pads 28 and 26, depending on whether the microsensor 10 is operating in a non-test mode or a test mode. In the non-test mode, the clocked voltage signals CLKPB and CLKP applied to input pads 28 and 26, respectively, are set at predetermined high and low voltage potentials $V_2$ and $V_4$. Upon initiating the self-test mode, the clocked voltage signals CLKP and CLKPB applied to input pads 28 and 26, respectively, are changed to high and low voltage potentials $V_1$ and $V_3$, which are offset in amplitude from voltages $V_2$ and $V_4$ by a predetermined voltage offset. By changing the voltage potential of the input signals, such as increasing (or decreasing) the voltage potential applied to the input pads 28 and 26 by a predetermined offset voltage, an electrostatic force is generated in the microsensor 10. The electrostatic force generated in the microsensor 10 causes the microsensor 10 to generate an output signal which is then compared to an expected value. If the measured microsensor output signal deviates from the expected value in excess of a predetermined amount, the microsensor 10 is determined to be out of calibration and/or faulty, and, hence an error flag is set.

In the non-test mode of operation, the microsensor 10 provides a measurement of the sensed motion (e.g., linear acceleration). In measuring linear acceleration, the inertial mass 12, when subjected to a linear acceleration about the sensing axis, moves relative to the fixed electrodes 20A–20D and within the restraining limits of the support arms 16A–16D. If the inertial mass 12 moves linearly and in a positive direction along the sensing axis, the opposing banks of variable capacitors formed by fixed electrodes 20A and 20C in quadrants 1 and 3 increase in capacitance, while the opposing banks of variable capacitors formed by electrodes 20B and 20D in quadrants 2 and 4 decrease in value, or vice versa. The change in capacitance provides a charge output signal $V_0$ that is indicative of the linear acceleration experienced. Since the support arms 16A–16D are integrally formed within slots 17 in the inertial mass 12 and attached to the central member 15, susceptibility to damage by external shock is thus reduced.

Figure 6:
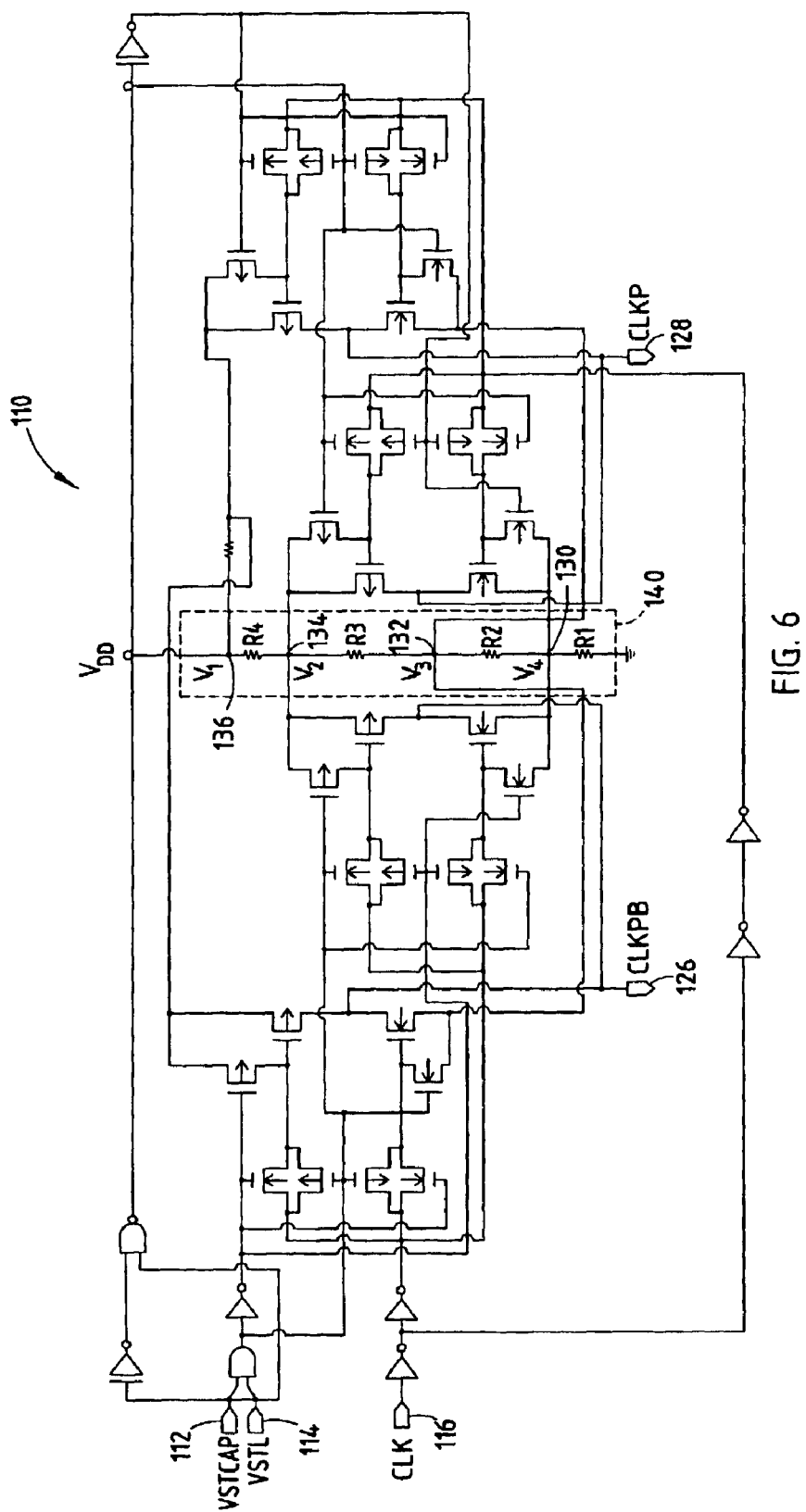
FIG. 6 is a circuit diagram of the self-test circuitry for testing the microsensor.

Referring to FIG. 6, the test circuit 110 is shown including integrated circuitry configured to control initiation of the test mode, to provide the voltage potentials $V_1$ through $V_4$, and to apply the selected voltage potentials as clocked signals CLKP and CLKPB to inputs on the microsensor. The test circuitry 110 includes an input 112 for receiving signal VSTCAP, and input 114 for receiving signal VSTL. Signal VSTL indicates whether the microsensor is to operate in either the test mode or the non-test mode. According to one example, VSTL is set to a logic one when the microsensor is in the test mode, and a logic zero when in the non-test mode. Alternatively, the logic of the VSTL signal may be reversed. The input signal VSTCAP controls which quadrants of the microsensor are to be tested with VSTCAP. In one state (e.g., logic one state), voltage potentials $V_1$ and $V_3$ are applied to the capacitive plates in quadrants 2 and 4 during the test mode, with VSTCAP in the other state (e.g., logic zero state), the voltage potentials $V_1$ and $V_3$ are applied to the capacitive plates in quadrants 1 and 3 during the test mode.

Test circuitry 110 also includes input 116 for receiving a clock signal, such as a square wave signal. The CLK clock signal includes a clock frequency which is used to select the frequency of the alternating voltages applied as signals CLKPB and CLKP. The test circuitry 110 further includes a resistor divider network 140 including four resistors coupled in series between a voltage supply $V_{DD}$ and ground. The voltage supply, according to one example, is +5 volts. The resistors R1 through R4 are selected to provide the voltage potentials $V_1$ through $V_4$ at corresponding nodes 130 through 136. According to the example shown and described herein, voltage $V_1$ at node 136 is set to 5.0 volts, voltage $V_2$ at node 134 is set to 4.5 volts, voltage $V_3$ at node 132 is set to 1.0 volts, and voltage $V_4$ at node 130 is set to a voltage of 0.5 volts. The test circuitry 110 produces clocked signals CLKP and CLKPB at outputs 128 and 126, respectively, which in turn are applied to the inputs 28 and 26 of the microsensor. The clocked signals CLKP and CLKPB have a frequency set by clock signal CLK and high and low voltage potential amplitudes set by the selected pairs of voltages $V_1$ and $V_3$ or $V_2$ and $V_4$, depending on the selected mode of operation.

Figure 7:
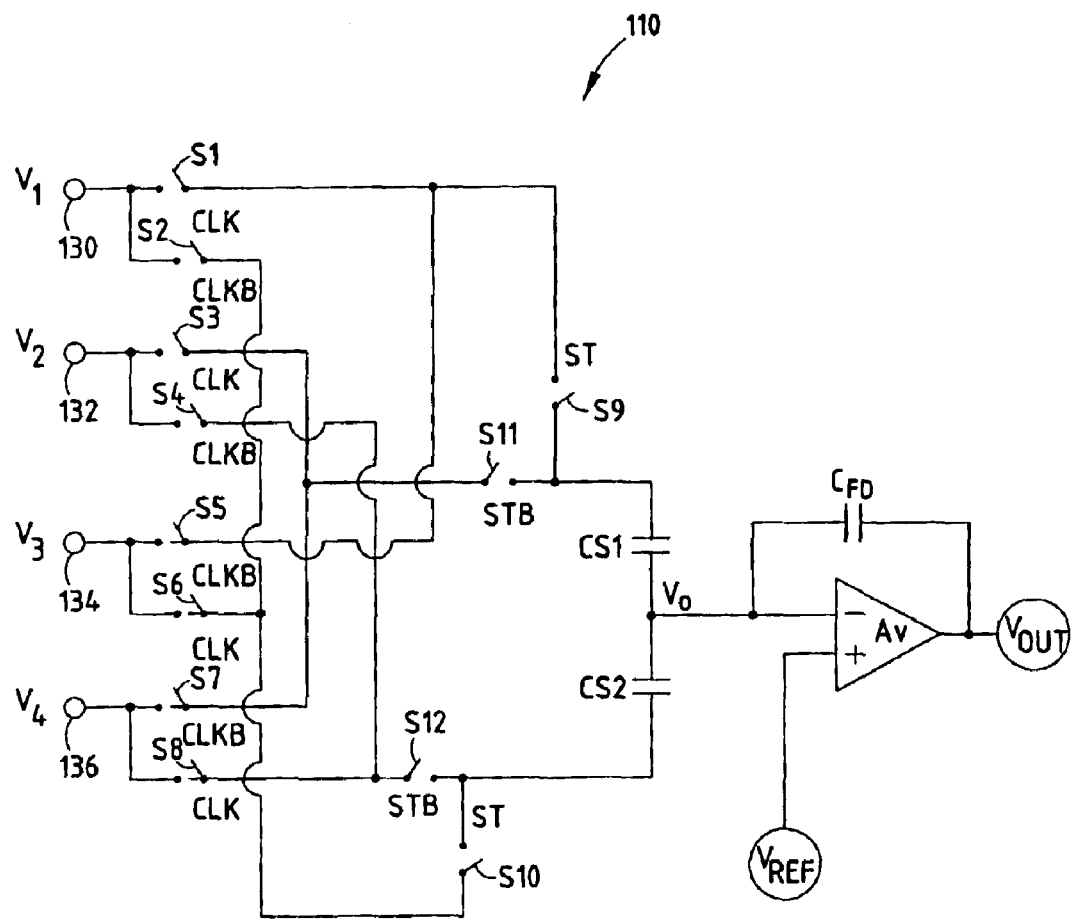
FIG. 7 is a circuit diagram further illustrating the self-test circuitry for testing the microsensor.

Referring to FIG. 7, the self-test circuit 110 is further shown in a simplified form coupled to exemplary equivalent capacitors CS1 and CS2 which generally represent the equivalent electrical circuit of the above-described microsensor. Capacitor CS1 represents the equivalent sum total of capacitance between electrode 20A and movable plates 14, and the capacitance between electrode 20C and movable plates 14, while capacitor CS2 represents the equivalent sum total of capacitance between electrode 20B and movable plates 14, and the capacitance between the electrode 20D and movable plates 14. An operational amplifier $A_V$ and capacitor $C_{FB}$ represent an element of the charge-to-voltage amplifier network. Voltage $V_{REF}$ is a reference voltage that defines the virtual ground of the amplifier $A_V$. The voltages $V_1$ through $V_4$ generated by the test circuitry 110 are stable direct current (DC) reference voltages that are applied as inputs to switches S1 through S8. The clock signal and its inverse CLKB define the state of the switches S1 through S8, and thus set the frequency of the clocked signals CLKP and CLKPB. Signals ST and STB are complimentary signals controlling the state of switches S9 through S12 that are used to connect the input terminals of equivalent capacitors CS1 and CS2 to the voltage potentials $V_1$ through $V_4$. According to an alternate embodiment, the switches S9 through S12 can be eliminated by employing a logic AND gate operation of the clock signals CLK and CLKB with the signals ST and STB.

During the normal non-test mode of operation of the microsensor, the switches S9 through S10 are turned off while switches S11 through S12 are turned on. Clock signals CLK and CLKB are non-overlapped square wave signals, which periodically turn on and off the switches S1 through S8 resulting in square wave signals with high and low voltage amplitude swings from either $V_1$ to $V_3$ or $V_2$ to $V_4$ at the same frequency of the clock signal CLK and CLKB. When voltage is applied to the inputs of the microsensor, an attractive electrostatic force $F_e$ is generated between the fixed and movable plates defining equivalent capacitance CS1 and CS2. The electrostatic force $F_e$ can be defined by the following equation.

$$F_e = A \cdot \epsilon \cdot [(V_2 - V_{REF})^2 + (V_4 - V_{REF})^2]/[2 \cdot (G - x_1)^2]$$

In the above equation, A represents the cross-sectional area of the capacitive plates of the equivalent capacitors CS1" and CS2, ε represents the composite permitivity of the medium between the capacitor plates, and G−x₁ is the gap-width change between the capacitor plates of the microsensor. The equation describing the displacement of the movable plate with respect to the fixed plate is $F_e+(m\times a)-Kx_1=0$, where K is the spring constant of the movable capacitive plate, and m×a is the internal force in the x-direction (for a linear accelerometer microsensor). Assuming no input acceleration, the above equation can be solved to find an expression for the gap-width between capacitive plates.

To initiate the self-test, the high and low voltages $V_2$ and $V_4$ are switched out and high and low voltages $V_1$ and $V_3$ are switched in as signals CLKP and CLKPB. This, in effect, results in a change in the overall offset voltage applied to the microsensor which, in the current example shown, is an increase of about 0.5 volts. The electrostatic force generated during the self-test mode is represented by $F_S$ shown in the following equation.

$$F_S = A \cdot \varepsilon \cdot [(V_1 - V_{REF})^2 + (V_3 - V_{REF})^2]/[2 \cdot (G - x_2)^2]$$

G−x₂ is the gap-width change between the capacitor plates of the microsensor under test. During the test mode, there is a net force change across the gap which is proportional to the $\Delta F = F_e - F_S$. By increasing the high and low voltages of clocked signals CLKP and CLKPB by an offset voltage, a net force change occurs between the fixed and movable capacitive plates. This change in net force results in a change in the output signal $V_{OUT}$ generated by the microsensor. The output signal generated by the microsensor is then compared to an expected value to determine if the microsensor is faulty and/or needs to be calibrated.

Figure 8:
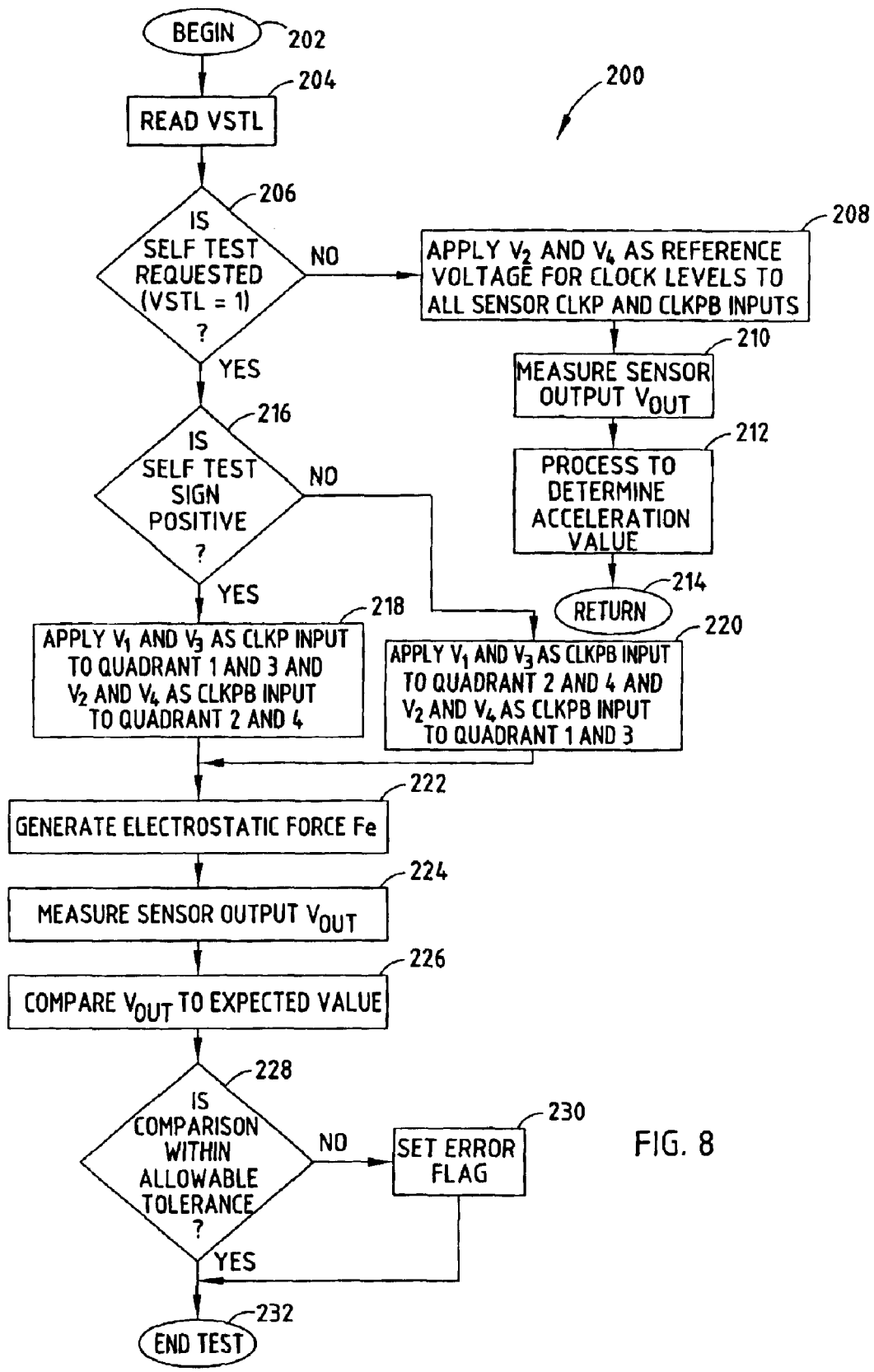
FIG. 8 is a flow diagram illustrating a method for testing a microsensor according to the present invention.

Referring to FIG. 8, a self-test routine 200 is illustrated for testing a microsensor according to the present invention. The self-test routine 200 begins at step 202 and reads the input signal VSTL in step 204. In decision step 206, the self-test routine 200 determines if the self-test has been requested, which occurs when the input signal VSTL is set equal to the binary one value. If no self-test has been requested, self-test routine 200 proceeds to step 208 to apply high and low voltage potentials $V_2$ and $V_4$ as the reference voltage for clock levels to all sensor signals CLKP and CLKPB. The microsensor is then operated in its normal non-test mode, during which the sensor output $V_{OUT}$ is measured in step 210, and the determined acceleration value is processed in step 212 before returning in step 214.

If the self-test mode has been requested, self-test routine 200 proceeds to decision step 216 to determine whether the self-test sign VSTLCAP signal is positive. If the self-test sign (VSTCAP) is positive, routine 200 proceeds to apply high and low voltage potentials $V_1$ and $V_3$ as the clocked signal CLKP input to the capacitor plates in quadrants 1 and 3 in step 218. At the same time high and low voltage potentials $V_2$ and $V_4$ are applied as the clocked signal CLKPB input to the capacitor plates in quadrants 2 and 4. If the self-test sign (VSTCAP) is negative, routine 200 applies high and low voltage potentials $V_1$ and $V_3$ as the clocked CLKPB signal input to the capacitor plates in quadrants 2 and 4 in step 220. At the same time, high and low voltage potentials $V_2$ and $V_4$ are applied as the clocked signal CLKP input to the capacitor plates in quadrants 1 and 3. Accordingly, the capacitive plates in quadrants 1 and 3 are tested separate from the capacitive plates in quadrants 2 and 4. The self-test causes both negative and positive mechanical movement along the sensing axis of the microsensor.

Once the signal inputs for clocked signals CLKP and CLKPB are selected in either of steps 218 or 220, the self-test routine 200 proceeds to step 222 to generate an electrostatic force $F_e$, and then to measure the sensor output $V_{OUT}$ in step 224. The sensor output $V_{OUT}$ is compared to an expected value in step 226. Routine 200 determines whether the comparison is within an allowable tolerance in decision step 228. If the comparison is not within an allowable tolerance, self-test routine 200 sets an error flag in step 230, before ending the test in step 232. It should be appreciated that by setting an error flag, the self-test routine 200 provides an indication that the microsensor is faulty and/or requires calibration.

Figure 9:
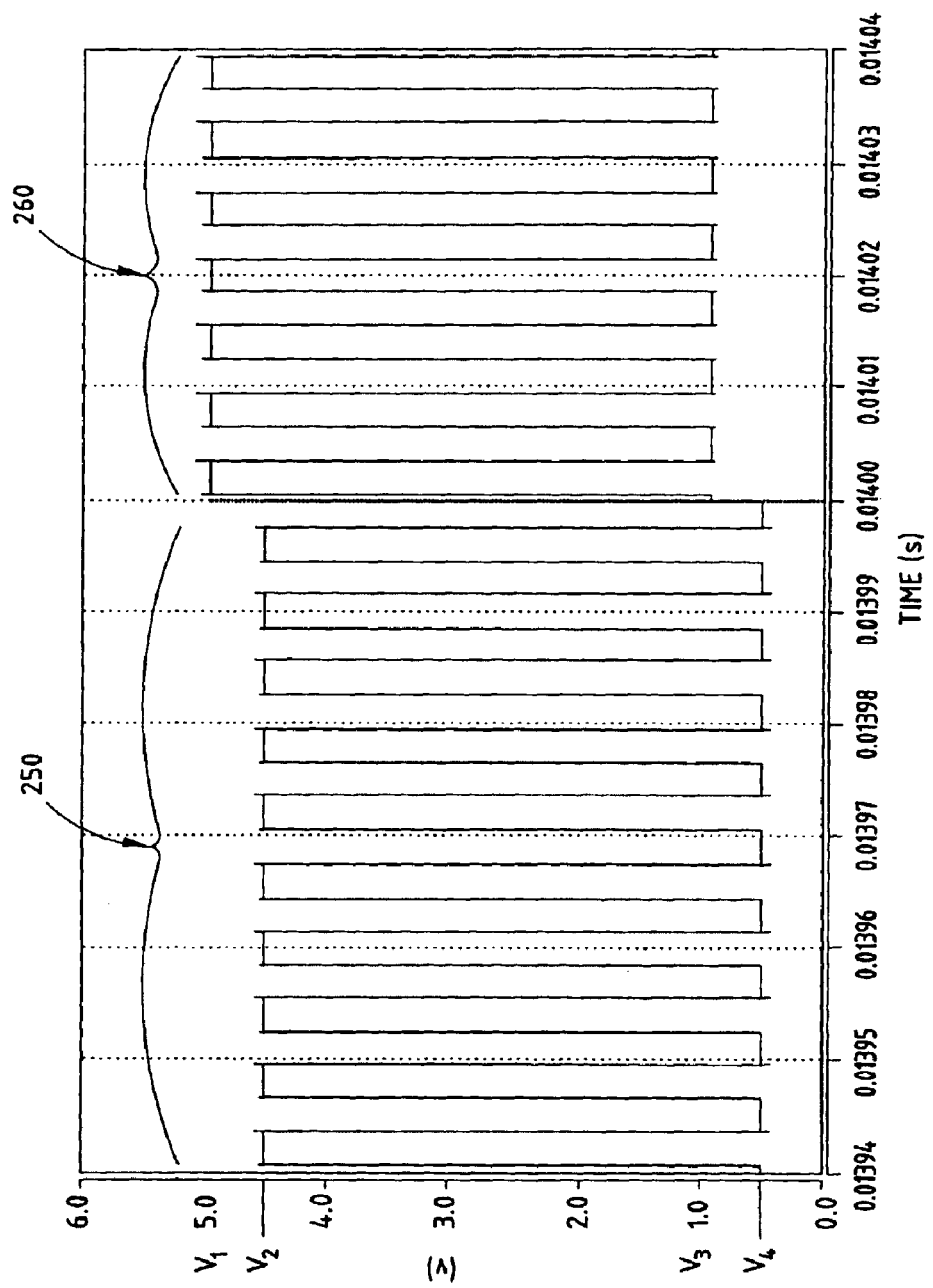
FIG. 9 is a graph illustrating the application of input voltages to the microsensor during both a non-test mode and a test mode.

Referring to FIG. 9, one example of the clocked signals CLKP and CLKPB applied to the microsensor both during a non-test mode and a test mode are illustrated. The signal 250 and one hundred eighty degrees (180°) out of phase version illustrate the clocked signals CLKP and CLKPB to the microsensor during the non-test mode of operation during which the voltage potential applied to the microsensor is an alternating waveform which alternates between high and low voltage potentials $V_2$ and $V_4$. During the test-mode of operation, represented by signal 260, the clocked signals CLKP or CLKPB applied to the microsensor have alternating high and low voltage potentials $V_1$ and $V_3$. Accordingly, the test circuit method of the present invention advantageously changes the high and low voltage potentials applied to the microsensor by an offset voltage, shown herein as 0.5 volts according to one example, so as to induce an electrostatic force in the microsensor, which generates an output in the microsensor that is then compared to an expected value to determine if the microsensor is functioning properly. It should further be appreciated that the self-test may be performed following manufacture of the microsensor, or may be performed at any time thereafter, including intermittent tests performed following use of the microsensor for its intended application.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. Method of testing a capacitive-type microsensor, said method comprising the steps of:
   applying a first signal having a first voltage potential to an input of a microsensor during a non-test operating mode;
   applying a second voltage signal having a second voltage potential different than the first voltage potential during a test mode, wherein the second voltage potential induces a change in electrostatic force in the microsensor as compared to the first voltage potential and the microsensor generates an output signal;
   monitoring the output signal of the microsensor;
   comparing the output signal to an expected value when the microsensor is in the test mode;
   determining if the microsensor is functioning properly as a function of the comparison; and
   setting a flag if the microsensor is determined not to be functioning properly.

2. The method as defined in claim 1 further comprising the steps of measuring gain of the microsensor and adjusting a gain factor based on the measured gain.

3. The method as defined in claim 2, wherein the step of adjusting the gain factor comprises electronically trimming microsensor circuitry.

4. The method as defined in claim 1 further comprising the steps of:

generating the first signal as a first alternating waveform signal having high and low voltage potentials; and generating the second signal as a second alternating waveform signal having high and low voltage potentials.

5. The method as defined in claim 4, wherein the first and second alternating wave signals comprise square wave signals.

6. The method as defined in claim 4, wherein the high and low voltage potentials of the first attenuating waveform signal are offset in voltage from the high and low voltage potentials of the second alternating waveform signal.

7. The method as defined in claim 1, wherein the microsensor comprises variable capacitors comprising fixed capacitive plates and movable capacitive plates arranged to form a capacitive device.

8. The method as defined in claim 1, wherein the microsensor comprises a capacitive type accelerometer.

9. Method of testing a capacitive-type microsensor, said method comprising the steps of:

applying a first signal having a first voltage potential to an input of a microsensor during a non-test operating mode;

applying a second voltage signal having a second voltage potential different than the first voltage potential during a test mode, wherein the second voltage potential induces a change in electrostatic force in the microsensor as compared to the first voltage potential and the microsensor generates an output signal;

monitoring the output signal of the microsensor;

comparing the output signal to an expected value when the microsensor is in the test mode;

determining if the microsensor is functioning properly as a function of the comparison;

receiving an input voltage from a voltage source; and dividing the input voltage into the first and second voltage potentials via a resistor divider network.

10. The method as defined in claim 9 further comprising the steps of measuring gain of the microsensor and adjusting a gain factor based on the measured gain.

11. The method as defined in claim 10, wherein the step of adjusting the gain factor comprises electronically trimming microsensor circuitry.

12. The method as defined in claim 9 further comprising the steps of:

generating the first signal as a first alternating waveform signal having high and low voltage potentials; and generating the second signal as a second alternating waveform signal having high and low voltage potentials.

13. The method as defined in claim 12, wherein the first and second alternating wave signals comprise square wave signals.

14. The method as defined in claim 12, wherein the high and low voltage potentials of the first attenuating waveform signal are offset in voltage from the high and low voltage potentials of the second alternating waveform signal.

15. The method as defined in claim 9, wherein the microsensor comprises variable capacitors comprising fixed capacitive plates and movable capacitive plates arranged to form a capacitive device.

16. The method as defined in claim 9, wherein the microsensor comprises a capacitive type accelerometer.

* * * * *